United States Patent
Kashima

(10) Patent No.: US 9,354,469 B2
(45) Date of Patent: May 31, 2016

(54) TRANSFLECTIVE LIQUID CRYSTAL DISPLAY PANEL AND DISPLAY DEVICE

(71) Applicant: BOE TECHNOLOGY GROUP CO., LTD., Beijing (CN)

(72) Inventor: Miki Kashima, Beijing (CN)

(73) Assignee: BOE TECHNOLOGY GROUP, CO., LTD., Beijing (CN)

( * ) Notice: Subject to any disclaimer, the term of this patent is extended or adjusted under 35 U.S.C. 154(b) by 9 days.

(21) Appl. No.: 14/403,756

(22) PCT Filed: Apr. 29, 2014

(86) PCT No.: PCT/CN2014/076435
§ 371 (c)(1),
(2) Date: Nov. 25, 2014

(87) PCT Pub. No.: WO2015/021793
PCT Pub. Date: Feb. 19, 2015

(65) Prior Publication Data
US 2016/0018697 A1    Jan. 21, 2016

(30) Foreign Application Priority Data

Aug. 16, 2013   (CN) .................... 2013 2 0503328 U

(51) Int. Cl.
*G02F 1/1335* (2006.01)
(52) U.S. Cl.
CPC .... *G02F 1/133536* (2013.01); *G02F 1/133528* (2013.01); *G02F 1/133555* (2013.01); *G02F 2001/133531* (2013.01)
(58) Field of Classification Search
None
See application file for complete search history.

(56) References Cited

U.S. PATENT DOCUMENTS

| | | | | |
|---|---|---|---|---|
| 2006/0119773 A1* | 6/2006 | Naka | ............... | G02F 1/133555 349/114 |
| 2006/0187385 A1* | 8/2006 | Liao | ............... | G02F 1/133305 349/114 |
| 2007/0002226 A1* | 1/2007 | Sakamoto | ......... | G02F 1/133555 349/114 |
| 2008/0143939 A1* | 6/2008 | Adachi | ............. | G02F 1/133555 349/114 |
| 2009/0153781 A1* | 6/2009 | Otani | .................. | G02B 5/3016 349/74 |

FOREIGN PATENT DOCUMENTS

| | | |
|---|---|---|
| CN | 101846840 A | 9/2010 |
| CN | 102207650 A | 10/2011 |
| CN | 202141872 U | 2/2012 |
| CN | 102566132 A | 7/2012 |
| CN | 202548490 U | 11/2012 |
| TW | 1356217 B1 | 1/2012 |

OTHER PUBLICATIONS

Search Report issued in International Application No. PCT/CN2014/076435, eleven (11) pages.

* cited by examiner

*Primary Examiner* — Ashok Patel
(74) *Attorney, Agent, or Firm* — Nath, Goldberg & Meyer; Joshua B. Goldberg

(57) ABSTRACT

The present invention discloses a transflective liquid crystal display panel and a liquid crystal display device comprising the same. Each pixel unit of the transflective liquid crystal display panel comprises a transmission region and a reflection region. The transflective liquid crystal display panel further comprises a conductive polarizing film layer having a first polarizing direction in the reflection region and a second polarizing direction in the transmission region.

10 Claims, 1 Drawing Sheet

TRANSFLECTIVE LIQUID CRYSTAL DISPLAY PANEL AND DISPLAY DEVICE

This is a National Phase Application filed under 35 U.S.C. 371 as a national stage of PCT/CN2014/076435, filed Apr. 29, 2014, and claims priority benefit from Chinese Application No. 201320503328.6, filed Aug. 16, 2013, the content of each of which is hereby incorporated by reference in its entirety.

FIELD OF THE INVENTION

The present invention relates to the field of liquid crystal display, and particularly relates to a transflective liquid crystal display panel and a display device.

BACKGROUND OF THE INVENTION

A typical transmissive display may have a reduced contrast of an image due to ambient light in outdoor environment or under bright light. By comparison, a reflective display, which relies on an external light source to achieve the display effect, exhibits better display effect and contrast in outdoor or under bright light, and can reduce a considerable amount of power consumed during use of backlight, thus the reflective display is very suitable for use in portable electronic products. However, when the brightness of the ambient light source is insufficient, the contrast and the brightness of the reflective display will be greatly influenced. Therefore, a transflective display, if manufactured by using a transmissive technique in combination with an auxiliary backlight source, can simultaneously have advantages of both the transmissive display and the reflective display.

For the transflective liquid crystal display, a transmission region and a reflection region having a reflecting layer are provided in one pixel region at the same time. In relatively dark places, an image may be displayed by using the backlight source and the transmission region in the pixel region; in relatively bright places, an image may be displayed by using the ambient light (not the backlight source) and the reflection region in the pixel region. Liquid crystal matrices are generally categorized into active liquid crystal matrices and passive liquid crystal matrices. Changing voltage by a passive element to control orientation of liquid crystal molecules is called as passive drive, and a passive liquid crystal matrix is utilized. Changing voltage by an active element is called as active drive. A passive element commonly used for driving liquid crystal is for example a capacitor, and an active element is for example a transistor. Thus, the transflective liquid crystal display is suitable not only for the passive drive, but also for an active drive technique using an amorphous silicon (a-Si) Thin Film Transistor (hereinafter referred to as TFT), a Low Temperature Polysilicon (LTPS) TFT, or the like. Since the transflective liquid crystal display does not need to use a backlight source for a long time, it has an advantage of reducing the power consumption.

At present, an Advanced super Dimension Switch (hereinafter referred to as ADS) type liquid crystal display, due to the advantages of wide view angle, high transmissivity, low color difference and the like, has been widely applied. For an ADS type liquid crystal display, a multidimensional electric field is formed by electric fields generated on the edges of slit electrodes in a same plane and electric fields generated between a slit electrode layer and a plate electrode layer, so that the liquid crystal molecules in all orientations between and right above the slit electrodes in a liquid crystal cell can be rotated, thereby improving the working efficiency of the liquid crystals and increasing the light transmittance.

A TFT array substrate in the ADS type liquid crystal display panel generally includes a substrate and a plurality of pixel units arranged in an array on the substrate. Each pixel unit includes a TFT electrically connected to a gate line and a data line on the substrate, respectively, and a pixel electrode electrically connected to a source of the TFT through a via hole. Specifically, the pixel electrode is a slit electrode having a certain angle of inclination. The TFT array substrate further includes a common electrode which forms an electric field with the pixel electrode, and degree of rotation of the liquid crystal molecules is controlled by changing intensity of the electric field formed between the pixel electrode and the common electrode. The ADS type liquid crystal display has the advantages of high contrast, wide view angle, high definition, etc. Thus, it is very important to develop a transflective ADS type liquid crystal display.

FIG. 1 shows a transflective ADS type liquid crystal display of the prior art. As shown in FIG. 1, a liquid crystal display panel of the display includes an upper polarizing layer 1, an upper substrate 2, a lower substrate 4, a lower polarizing layer 5, and a liquid crystal layer 3 provided between the upper substrate 2 and the lower substrate 4. Each pixel unit of the liquid crystal display panel may be divided into a transmission region T and a reflection region R. When preparing the liquid crystal display panel by using an existing technique, due to different display modes of the transmission region T and the reflection region R (that is, the transmission region T is in a normally black display mode while the reflection region R is in a normally white display mode), a technique such as an in-cell retarder, a multi-domain structure or the like is required to be employed for the ADS type liquid crystal display, resulting in complex process and large difficulty. Moreover, due to reasons such as rubbing and touching of the upper substrate or the like, the static electricity generated on the upper substrate may cause a defective electric field inside the transflective ADS type liquid crystal display, resulting in defective liquid crystal orientation.

In order to solve the above problems, the present invention makes some beneficial improvements.

SUMMARY OF THE INVENTION

1. Technical Problems to be Solved

An objective of the present invention is to provide a transflective liquid crystal display panel and a display device. The transflective liquid crystal display panel can prevent internal defects caused by static electricity generated outside the liquid crystal display panel, and processing technique for the transflective liquid crystal display panel is simple and fast.

2. Technical Solutions

The present invention is implemented by the following technical solutions.

A transflective liquid crystal display panel is provided, each of pixel units of the transflective liquid crystal display panel includes a transmission region and a reflection region, and the transflective liquid crystal display panel further includes a conductive polarizing film layer, the conductive polarizing film layer has a first polarizing direction in the reflection region and a second polarizing direction in the transmission region.

A liquid crystal layer provided in the transmission region is a transmission region liquid crystal layer, and a liquid crystal layer provided in the reflection region is a reflection region liquid crystal layer, wherein a thickness of the reflection region liquid crystal layer is a half of that of the transmission region liquid crystal layer.

According to a preferable embodiment, the first polarizing direction of the conductive polarizing film layer in the reflection region is 45°, and the second polarizing direction of the conductive polarizing film layer in the transmission region is 90°.

The conductive polarizing film layer may be provided on a surface of a display side substrate of the transflective liquid crystal display panel, the surface of the display side substrate being back against a non-display side substrate of the transflective liquid crystal display panel.

The transflective liquid crystal display panel is an Advanced Super Dimension Switch (ADS) type liquid crystal display panel.

The present invention further provides a liquid crystal display device, including the transflective liquid crystal display panel according to the present invention.

3. Beneficial Effects

Compared with the prior art and the existing products, the present invention has the following advantages.

1. In the present invention, by forming the conductive polarizing film layer on the upper surface of an upper substrate, defective orientation of the liquid crystal molecules inside the liquid crystal display panel caused by static electricity generated outside the liquid crystal display panel can be prevented.

2. As the conductive polarizing film layer provided by the present invention is formed on the outer side of the upper substrate, the in-cell retarder for the ADS type transflective liquid crystal display panel is avoided, resulting in simple and fast processing technique. In addition, since the conductive polarizing film layer may employ a single-layer thin film structure, the processing technique of an upper polarizer (or upper polarizing layer) is omitted, thereby improving the processing efficiency and lowering the processing cost.

DETAILED DESCRIPTION OF THE EMBODIMENTS

Specific embodiments of the present invention will be further described in detail as below with reference to the accompanying drawings.

Figure 1:
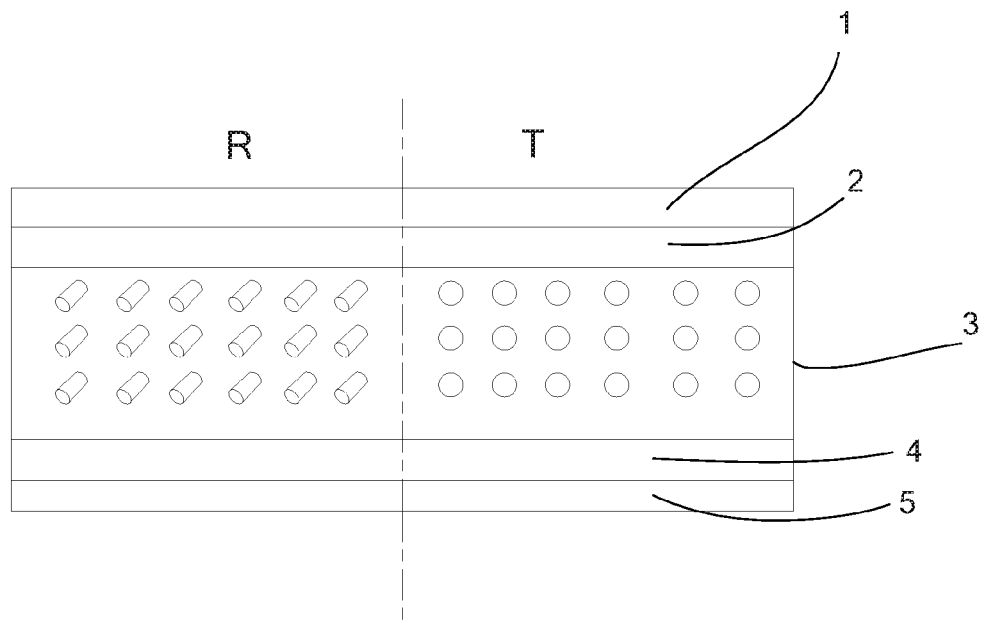
FIG. 1 is a schematic diagram of a transflective ADS type liquid crystal display panel according to the prior art.
Figure 2:
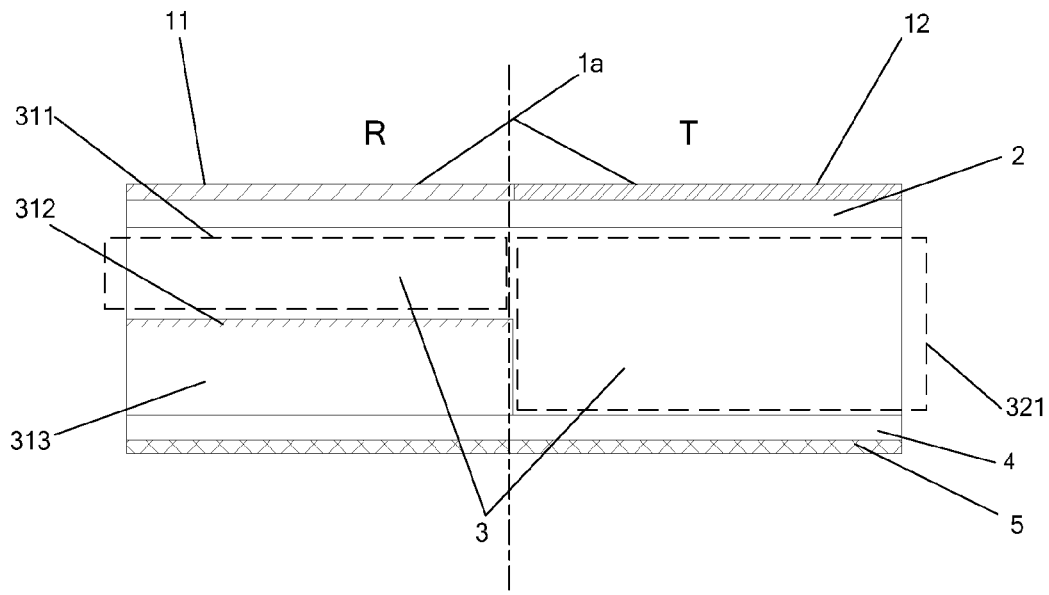
FIG. 2 is a schematic diagram of the transflective ADS type liquid crystal display panel according to an embodiment of the present invention.

As shown in FIG. 2, the embodiment provides an ADS type transflective liquid crystal display panel, including a conductive polarizing film layer 1a, which is provided on an upper surface of an upper substrate 2 as an upper polarizing film layer of the liquid crystal display panel. The liquid crystal display panel further includes a lower substrate 4, and uniformly orientated liquid crystal layers 3 provided between the upper substrate 2 and the lower substrate 4. A lower polarizing layer 5 is provided on a lower surface of the lower substrate 4. A color filter (not shown) may be formed on the upper substrate 2, and a thin film transistor (not shown) may be formed below the lower substrate 4. Each pixel unit of the transflective liquid crystal display panel may include a transmission region T and a reflection region R. The liquid crystal layer 3 provided in the transmission region T is a transmission region liquid crystal layer 321, and the liquid crystal layer 3 provided in the reflection region R is a reflection region liquid crystal layer 311. A reflecting layer 312 and a resin layer 313 are sequentially provided between the reflection region liquid crystal layer 311 and the lower substrate 4.

The conductive polarizing film layer 1a may be provided on the upper surface of the upper substrate 2, that is, the conductive polarizing film layer 1a is provided on a surface of a display side substrate (upper substrate 2) of the transflective liquid crystal display panel back against the non-display side substrate (lower substrate 4) of the transflective liquid crystal display panel. The conductive polarizing film layer 1a has a first polarizing direction in the reflection region R and a second polarizing direction in the transmission region T. The conductive polarizing film layer 1a may be coated on the upper substrate 2 in a printing manner.

According to the embodiment, because the conductive polarizing film layer 1a is provided on the upper substrate 2, the static electricity generated on the upper substrate 2 may be led to the outside of the upper substrate 2 through the conductive polarizing film layer 1a without causing defective orientation of the liquid crystal molecules inside the liquid crystal layers 3. The conductive polarizing film layer provided by the embodiment may be applied to various liquid crystal display panels of different display modes, such as Twisted Nematic (TN) panels, In-Plane Switching (IPS) panels and the like. In particular, for the ADS type transflective liquid crystal display panel, employing an in-cell retarder technique in its substrates can be avoided, which makes the processing technique simple and fast.

According to the embodiment, the liquid crystal layers 3 include the reflection region liquid crystal layer 311 and the transmission region liquid crystal layer 321. The thickness of the reflection region liquid crystal layer 312 is a half of that of the transmission region liquid crystal layer 311. The thickness of the reflection region liquid crystal layer 311 may be controlled by the thickness of the resin layer 313. According to an embodiment, the thickness of the reflection region liquid crystal layer 311 included in the liquid crystal layers 3 may be about 2.1 μm, and the thickness of the transmission region liquid crystal layer 321 may be about 4.2 μm. It should be noted that the thicknesses of the reflection region liquid crystal layer 311 and the transmission region liquid crystal layer 321 are not limited, as long as the transflective liquid crystal display panel in the normally white mode may be implemented.

The conductive polarizing film layer may employ a layered stacking structure, which is a layered structure including a combination of a conductive thin film layer and a polarizing film layer, but such structure results in cumbersome processing technique. Preferably, a conductive polarizing film layer with a single-layer thin film structure may be employed, thereby omitting processing of an upper polarizer (or upper polarizing layer), improving the processing efficiency and reducing the processing cost. The conductive polarizing layer may be processed by using a conductive transparent material, and reference can be made to Patent JP 2009-230130, which is incorporated herein by reference in its entirety.

Referring to FIG. 2, the conductive polarizing film layer 1a may include a part 11 provided in the reflection region R and a part 12 provided in the transmission region T (hereinafter referred to as a polarizing film layer reflection part 11 and a polarizing film layer transmission part 12, respectively), The polarizing film layer reflection part 11 whose polarizing direction (hereinafter, referred to as first polarizing direction) corresponds to the polarizing direction of the reflection region liquid crystal layer 311 is provided above the reflection region liquid crystal layer 311. The polarizing film layer transmission part 12 whose polarizing direction (hereinafter, referred to as second polarizing direction) corresponds to the polarizing direction of the transmission region liquid crystal layer 321 is provided above the transmission region liquid crystal layer 321. The first polarizing direction of the polarizing film layer reflection part 11 corresponding to the reflection region liquid crystal layer 311 may be different from the second polarizing direction of the polarizing film layer transmission part 12 corresponding to the transmission region liquid crystal layer 321.

Preferably, the first polarizing direction of the polarizing film layer reflection part 11 may be 45°, and the second polarizing direction of the polarizing film layer transmission part 12 may be 90°, thereby obtaining the ADS type transflective liquid crystal display panel with both the reflection region R and the transmission region T in the normally white mode.

It should be noted that, the first polarizing direction and the second polarizing direction are not limited, as long as the transflective liquid crystal display panel in the normally white mode can be implemented.

Further, the upper substrate 2 and the lower substrate 4 of the ADS type transflective liquid crystal display panel provided according to the embodiment may be coated with PI solution, and then rubbed to prepare liquid crystal orientating layers. The rubbing direction of the upper substrate 2 may be 45°, and the rubbing direction of the lower substrate 4 may be 225°.

The lower polarizing layer 5, the polarizing direction of which may be 0°, is provided under the lower substrate 4.

The liquid crystal display panel according to the embodiment may be applied to various liquid crystal display devices and electronic devices including a liquid crystal display device, for example, liquid crystal displays, OLED displays, mobile phones, tablet computers, TV sets, notebook computers, digital photo frames, navigators or any product or component with a display function.

The foregoing description merely describes preferable embodiments of the present invention and is not intended to form any limitation to the present invention. Any modification, equivalent substitution or improvement made within the spirit and principle of the present invention shall fall into the protection scope of the present invention.

The invention claimed is:

1. A transflective liquid crystal display panel, each of pixel units of the transflective liquid crystal display panel comprising a transmission region and a reflection region, wherein,
   the transflective liquid crystal display panel further comprises a conductive polarizing film layer, the conductive polarizing film layer has a first polarizing direction in the reflection region and a second polarizing direction in the transmission region.

2. The transflective liquid crystal display panel according to claim 1, wherein,
   a liquid crystal layer provided in the transmission region is a transmission region liquid crystal layer, and a liquid crystal layer provided in the reflection region is a reflection region liquid crystal layer, wherein the thickness of the reflection region liquid crystal layer is a half of that of the transmission region liquid crystal layer.

3. The transflective liquid crystal display panel according to claim 1, wherein,
   a first polarizing direction of the conductive polarizing film layer in the reflection region is 45°, and a second polarizing direction of the conductive polarizing film layer in the transmission region is 90°.

4. The transflective liquid crystal display panel according to claim 1, wherein,
   the conductive polarizing film layer is provided on a surface of a display side substrate of the transflective liquid crystal display panel, the surface of the display side substrate being back against a non-display side substrate of the transflective liquid crystal display panel.

5. The transflective liquid crystal display panel according to claim 1, wherein,
   the transflective liquid crystal display panel is an Advanced Super Dimension Switch type liquid crystal display panel.

6. A liquid crystal display device, comprising a transflective liquid crystal display panel each of pixel units of the transflective liquid crystal display panel comprising a transmission region and a reflection region, wherein,
   the transflective liquid crystal display panel further comprises a conductive polarizing film layer, the conductive polarizing film layer has a first polarizing direction in the reflection region and a second polarizing direction in the transmission region.

7. The liquid crystal display device according to claim 6, wherein,
   a liquid crystal layer provided in the transmission region is a transmission region liquid crystal layer, and a liquid crystal layer provided in the reflection region is a reflection region liquid crystal layer, wherein the thickness of the reflection region liquid crystal layer is a half of that of the transmission region liquid crystal layer.

8. The liquid crystal display device according to claim 6, wherein,
   a first polarizing direction of the conductive polarizing film layer in the reflection region is 45°, and a second polarizing direction of the conductive polarizing film layer in the transmission region is 90°.

9. The liquid crystal display device according to claim 6, wherein,
   the conductive polarizing film layer is provided on a surface of a display side substrate of the transflective liquid crystal display panel, the surface of the display side substrate being back against a non-display side substrate of the transflective liquid crystal display panel.

10. The liquid crystal display device according to claim 6, wherein,
    the transflective liquid crystal display panel is an Advanced Super Dimension Switch type liquid crystal display panel.

* * * * *